(12) United States Patent
Lagar-Cavilla et al.

(10) Patent No.: US 8,584,242 B2
(45) Date of Patent: Nov. 12, 2013

(54) REMOTE-ASSISTED MALWARE DETECTION

(75) Inventors: Horacio Andres Lagar-Cavilla, Morris Plains, NJ (US); Alexander Varshavsky, East Hanover, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 55 days.

(21) Appl. No.: 13/180,851

(22) Filed: Jul. 12, 2011

(65) Prior Publication Data

US 2013/0019306 A1    Jan. 17, 2013

(51) Int. Cl.
  *G06F 11/00* (2006.01)
(52) U.S. Cl.
  USPC .......................................................... 726/24
(58) Field of Classification Search
  None
  See application file for complete search history.

(56) References Cited

U.S. PATENT DOCUMENTS

| | | | |
|---|---|---|---|
| 7,096,501 B2 | 8/2006 | Kouznetsov | |
| 7,328,453 B2 * | 2/2008 | Merkle et al. | 726/23 |
| 7,540,031 B2 | 5/2009 | Kouznetsov | |
| 7,631,356 B2 * | 12/2009 | Hatlelid et al. | 726/24 |
| 7,797,747 B1 * | 9/2010 | Ferrie | 726/24 |
| 7,827,611 B2 | 11/2010 | Kouznetsov | |
| 7,861,303 B2 | 12/2010 | Kouznetsov | |
| 8,271,450 B2 * | 9/2012 | Horovitz et al. | 707/661 |
| 2004/0030912 A1 * | 2/2004 | Merkle et al. | 713/200 |
| 2004/0123136 A1 * | 6/2004 | Jung | 713/200 |
| 2006/0200863 A1 * | 9/2006 | Ray et al. | 726/24 |
| 2010/0037321 A1 | 2/2010 | Oz | |
| 2010/0313270 A1 | 12/2010 | Kim | |
| 2010/0328064 A1 | 12/2010 | Rogel | |
| 2011/0047620 A1 * | 2/2011 | Mahaffey et al. | 726/23 |

OTHER PUBLICATIONS

Jon Oberheide el. al., Virtualized In-Cloud Security Services for Mobile Devices, University of Michigan, Ann Arbor, http://citeseerx.ist.psu.edu/viewdoc/summary?doi=10.1.1.169.5857, 2008.
Carlos Rozas el. al., Enhanced Detection of Malware, InfoQ, Sep. 30, 2009, http://www.infoq.com/articles/malware-detection-intel.
Tim Mather, What Can Be Done Better in the Cloud?, RSA Conference, Sep. 12, 2010, https://365.rsaconference.com/blogs/tim-mather/2010/09/12/what-can-be-done-better-in-the-cloud.
Trend Micro Mobile Security for Android Protects From a Targeted Surge of Web Threats and Cybercriminals, PR 4 Newswire, Mar. 22, 2011, http://www.trendmicro.com.hk/hk/news/news_20110322_andriod_html.

* cited by examiner

*Primary Examiner* — Cordelia Zecher
(74) *Attorney, Agent, or Firm* — Hartman & Citrin LLC

(57) ABSTRACT

Remote assistance is provided to a mobile device across a network to enable malware detection. The mobile device transmits potentially infected memory pages to a remote server across a network. The remote server performs analysis, and provides feedback to the mobile device. Based on the received feedback, the mobile device halts a process, or retrieves and transmits additional memory pages to the remote server for more analysis. This process is repeated until a compromised region of memory is identified and/or isolated for further repair to be performed. The feedback from the remote server reduces the processing and storage burden on the mobile device, resulting in a more reliable detection that uses fewer resources. Embodiments including hypervisors and virtual machines are disclosed.

20 Claims, 5 Drawing Sheets

REMOTE-ASSISTED MALWARE DETECTION

BACKGROUND OF THE SUBJECT DISCLOSURE

1. Field of the Subject Disclosure

The subject disclosure relates to detecting malicious software on mobile devices. In particular, the subject disclosure relates to offloading certain malware detection procedures to a remote server on a network.

2. Background of the Subject Disclosure

Mobile electronic devices, or mobile devices, have become an integral part of our everyday lives. Cellular telephones, smartphones, netbooks, and several other devices are used by billions to perform everyday tasks for communication, scheduling, etc. Essentially, the core components of historically larger computers, such as transceivers, displays, storage, and powerful processors are being miniaturized and crammed into small portable devices that are becoming more and more ubiquitous. Modern mobile devices such as the IPHONE and NOKIA N800 run near-complete versions of commodity operating systems like BSD and LINUX. Functionality like complete multiprotocol networking stacks, UI toolkits, and file systems provide developers with a rich environment to quickly build applications. However, this complexity opens up mobile devices to the same wide range of threats that target desktops.

One such threat is that of malicious software, malware, including viruses and rootkits. Malware is created by malicious entities for several nefarious purposes, spreads itself like a computer virus, and may cripple or even completely disable an electronic device. A particularly potent form of malware is a rootkit, so called because it targets the root of the system, i.e., the operating system (OS) kernel itself. By infecting the code and data of the OS kernel, rootkits gain control over the layer traditionally considered the trusted computing base (TCB). A recent study has reported a 600% increase in the number of rootkits in a three year period between 2004 and 2006. As this explosive growth continues, the increasing complexity of the hardware and software stack of mobile devices, coupled with the increasing economic value of personal data stored on mobile devices, point to an impending adoption of rootkits in the mobile malware arena.

Currently, mobile security solutions mirror the traditional desktop model in which they run detection services on the device. This approach is complex and resource intensive in both computation and power. Code integrity monitors such as Patagonix, and kernel data integrity monitors such as Gibraltar offer protection against malicious code in the kernel by checking the integrity of static code pages or by scanning the kernel's data segment and ensuring that its data structures satisfy certain integrity properties, which are normally violated in rootkit-infected kernels. This checking of the integrity of all kernel data structures and executable code is a thorough process, but requires significant processing overhead. With mobile devices, this leads to another problem: excessive power consumption. Security mechanisms today focus on well-provisioned computers such as heavy-duty servers or user desktops. Mobile devices present a fundamental departure from these classes of machine because they are critically resource-constrained.

While advances throughout the last decade in mobile processor, GPU, and wireless capabilities have been staggering, the hard fact is that mobile devices utilize batteries with a limited amount of stored power. Without the limit of resource constraints, security mechanisms will check everything they can, all the time. In a mobile device aggressively performing checks on large sets of security targets will inexorably lead to exhaustion of energy and other resources and the inability to carry on useful tasks. However, no currently known approach addresses the problem of providing security mechanisms in a battery-constrained environment.

What is therefore needed is a more efficient approach to detecting malware on mobile devices, with wider coverage than that possible on the resource-constrained mobile device itself.

SUMMARY OF THE SUBJECT DISCLOSURE

The subject disclosure solves the above problems and more by providing remote-assistance to a mobile device across a network. The mobile device transmits potentially infected memory pages to a remote server across a network. The remote server performs analysis, and provides feedback to the mobile device. Based on the received feedback, the mobile device halts a process, or finds and transmits additional memory pages to the remote server for more analysis. This process is repeated until a compromised region of memory is identified and/or isolated for further repair to be performed. The feedback from the remote server reduces the processing and storage burden on the mobile device, resulting in a more reliable detection that uses fewer resources.

In one exemplary embodiment, the subject disclosure is a method for detecting malware on a mobile device, including detecting a page fault caused by a memory page on a guest domain of the mobile device, recording the page fault in a page table on a host domain of the mobile device, applying a rule to the page fault, the rule identifying one or more matching pages, retrieving the one or more matching pages from the guest domain, and transmitting the one or more matching pages along with the memory page to a remote server for analysis. In response to the feedback rule, the mobile device may store the feedback rule in a rule database on the host memory, halt the process, retrieve matching memory pages, or determine that the matching pages include a private datum, and may remove the private datum from the one or more matching pages. The host domain may be a hypervisor, in which case the guest domain is a virtual machine residing on the hypervisor. Alternatively, the host domain is a kernel, and the guest domain is a user space process residing on the kernel.

In another exemplary embodiment, the subject disclosure is a mobile device including a processor, a memory in communication with the processor, a guest domain on the memory, the guest domain including at least a process and a memory page associated with the process, and a host domain on the memory, the host domain having a logic unit including instructions for detecting a page fault caused by a memory page on the guest domain, recording the page fault in a page table on the host domain, applying a rule to the page fault, the rule identifying one or more matching pages, retrieving the one or more matching pages from the guest domain, and transmitting the one or more matching pages along with the memory page to a remote server for analysis. The mobile device further includes transceiver for transmitting the memory pages to the remote server across a network.

In yet another exemplary embodiment, the present subject disclosure is a system for detecting malware on a mobile device, including a remote server on a network, the remote server in communication with a mobile device through the network, the mobile device having a processor and a memory, the memory including a guest domain and a host domain, the guest domain including a process and a memory page associated with the process, the host domain having a logic unit including instructions for detecting a page fault caused by a memory page on the guest domain, recording the page fault in a page table on the host domain, applying a rule to the page fault, the rule identifying one or more matching pages, retrieving the one or more matching pages from the guest domain, and transmitting the one or more matching pages along with the memory page to the remote server; and analysis logic on the remote server for determining security properties of the received memory pages, generating a feedback rule, and transmitting the feedback rule to the host domain on the mobile device.

DETAILED DESCRIPTION OF THE SUBJECT DISCLOSURE

Figure 1:
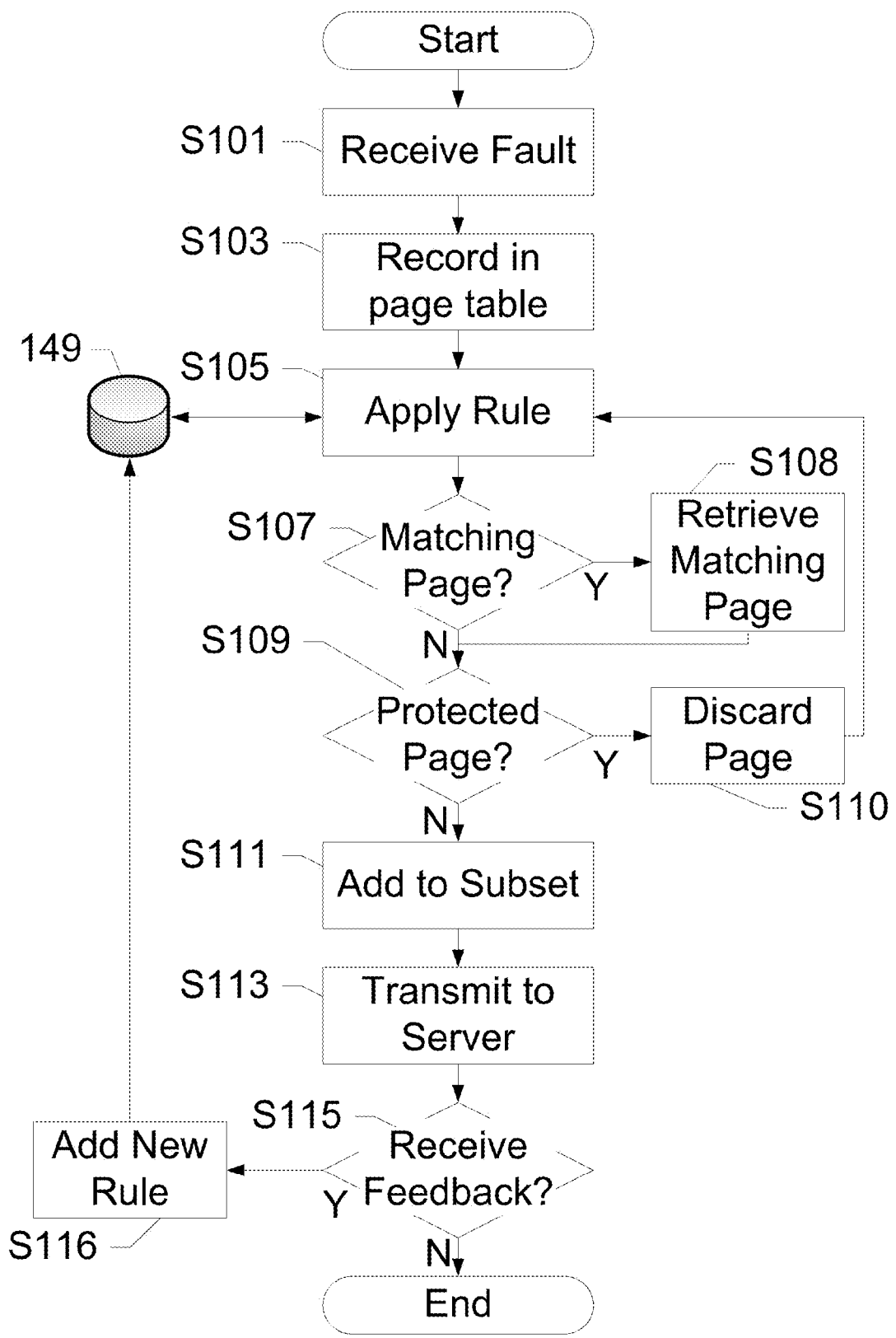
FIG. 1 shows a method for detecting malware, according to an exemplary embodiment of the subject disclosure.

The subject disclosure presents methods, devices, and systems for remote-assisted malware detection on a mobile device. A mobile device transmits potentially infected memory pages to a remote server across a network. The remote server performs analysis, and provides feedback to the mobile device. Based on the received feedback, the mobile device halts a process, or finds and transmits additional memory pages to the remote server for more analysis. This process is repeated until a compromised region of memory is identified and/or isolated until further repair can be performed. Remote assistance conserves scarce mobile resources and improves detection of modern threats such as viruses and malware by relocating scanning procedures to a remote server. Expending bandwidth in this way reduces mobile CPU and memory resources and saves power. Further, crowdsourcing of diverse infections from several mobile devices increases the chances of providing efficient and accurate feedback to mobile devices, therefore halting more malware. Unlike existing antivirus software that cannot run multiple detection engines on a single device due to technical conflicts and resource constraints, moving detection capabilities to a remote server allows the use of multiple antivirus engines in parallel by hosting them in virtualized containers. Each candidate data structure or memory page may be analyzed by multiple detection engines to determine whether it is malicious or unwanted. The use of virtualization allows the network service to scale to large numbers of engines and users. Finally, security may be traded off by modulating the coverage of the surface of attacks a malware detector will cover, as well as modulating the frequency with which to invoke malware detection.

"Mobile device", as used herein and throughout this disclosure, refers to any electronic device capable of wirelessly sending and receiving data. A mobile device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic", as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

A mobile device also includes a network interface enabling the transceiver to connect to a network. One example of a network interface is a Subscriber Identity Module (SIM) card. A "network" can include broadband wide-area networks, local-area networks, and personal area networks. Communication across a network is preferably packet-based; however, radio and frequency/amplitude modulations networks can enable communication between communication devices using appropriate analog-digital-analog converters and other elements. Examples of radio networks include Wi-Fi and BLUETOOTH (wireless technology standard for exchanging data over short distances) networks, with communication being enabled by hardware elements called "transceivers." Wireless communication devices may have more than one transceiver, capable of communicating over different networks. For example, a cellular telephone can include a GPRS transceiver for communicating with a cellular base station, a Wi-Fi transceiver for communicating with a Wi-Fi network, and a BLUETOOTH (wireless technology standard for exchanging data over short distances) transceiver for communicating with a BLUETOOTH (wireless technology standard for exchanging data over short distances) device. A network typically includes a plurality of elements that host logic for performing tasks on the network.

The subject disclosure involves detection of malware (including rootkits) and preventing infected pages from being executed. A rootkit is a type of malware that infects the executable code and data of an operating system (OS) kernel. By infecting the kernel itself, rootkits gain control over the layer historically referred to as the trusted computing base (TCB).

A kernel is a central component of most operating systems. A kernel includes at least executable code, and kernel data. Kernel code includes executables such as compiled code, system utilities, and services associated with the operating system. Kernel data includes non-executable control data such as system call tables, interrupt descriptor tables, function pointers, etc. Further, kernel data includes non-control kernel data such as parameters controlling key cryptographic routines. Both code and data are stored on memory pages, or pages. A memory page or "page", as used herein and throughout this disclosure, is a unit of granularity for both code and data.

According to certain embodiments in the subject disclosure, a guest domain resides on a host domain including a hypervisor. Generally, a hypervisor is a software layer that mediates the sharing of underlying hardware resources between several virtual operating systems, or domains. A "virtual machine" is a software implementation or "emulation" of a machine, i.e. a computer, which executes a computer program like a physical machine would. By using a "hardware abstraction layer", the hypervisor handles interrupts from the operating system to the processor, schedule processor time among the guest operating systems and allocate cores to virtual machines, manage devices and allocate memory. Further, a hypervisor can provide a guest operating system with access to a generic network interface by translating those access calls to a particular device driver, said interface being shared between the different guest operating systems. Such "virtual network interfaces" enable the creation of a "virtual network" wherein each virtual machine has its own private unique network address to communicate with each other and with the hypervisor or host operating system. By managing the virtual network, logic on the hypervisor can be deployed to secure each virtual machine using a different security model, such that virtual machines are restricted from accessing data stored on each other's memory units.

For the following description, it can be assumed that most correspondingly labeled structures across the figures (e.g., 240 and 340, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1 shows a method for detecting malware, according to an exemplary embodiment of the subject disclosure. The method starts with receiving a fault S101 from a processor exception. The exception may be caused either by modification or execution of a memory page that is part of a process. In this embodiment, a host agent follows a rule to track changes to a particular memory page. The process associated with the memory page resides in a guest domain, such as a virtual machine on a hypervisor, or an application running on a kernel. Consequently, any memory use by the process is accessible from the host domain (hypervisor or kernel). The host agent accesses a locally stored (in the trusted domain) page table and disables write permissions on the memory page. Subsequently, any attempt to write this on the memory page causes the processor to fault. In other words, the permission problem puts the processor into an exception mode. At this point, the host agent logic takes over, stores the page fault for further processing, and enables the write permission for the memory page. The process then leaves the exception state and is permitted to continue, while the host agent determines the next step. A similar process exception arises with execution faults, for instance when a page is executed without the appropriate permission.

The fault is recorded S103 in a page table stored on a trusted domain. The page fault is further tagged with one or more of several tags, including a process identifier, page address, process state, and category. These tags may vary with the service being offered, the type of implementation (see FIGS. 3-5), etc. Generally, the page table maintains a direct relationship between any memory page and an associated process that occupies, modifies, or attempts to access that memory page.

A rule database 149 is accessed to determine any rules that apply to the particular memory page S105 as indicated by the page table. The rule may include instructions to transmit additional matching pages S107 to the remote server. For instance, the host agent may be instructed to generate a packet including a plurality of memory pages associated with the page associated with the process, and transmit the packet to a remote server. The rule would thus identify the memory pages (or regions thereof) to be transmitted. The host agent would scan the guest domain (kernel or application), retrieve the matching page S108 if any, and continue the process. A rule may further identify memory pages based on tags associated with the memory page.

Further, there may be some sensitive information stored in the memory page or plurality of memory pages. For instance, parts of a memory page that are not relevant to malware detection may contain sensitive information, such as social security numbers, credit card numbers, etc. This information can be inadvertently transmitted with a memory page. For instance, when a file on disk containing sensitive data is saved (via an instruction to the operating system to send the file to disk) an intermediate buffer is created, and may share the memory page associated with the compromised process. This information should not be shared across a network. Therefore, the privacy rule identifies such sensitive content and is applied S109 to remove the sensitive information of the memory page S110 before transmitting the memory page to the remote server, or applying additional rules S105.

The memory pages, and/or regions thereof are added to a subset S111. The subset, including any tags or additional information, is transmitted to a remote server S113. The remote server may be a local machine accessible via a local area network (LAN), or a cloud server centrally located on a service provider's network or a third-party network.

The remote server provides feedback S115 to the host agent based upon analysis performed on the transmitted memory pages. If no feedback is received, then the process ends. If feedback is received, then the feedback is incorporated as a new rule S116 which is added to rule database 149, and the process restarts. For instance, received feedback includes rules instructing the mobile device to only transmit specific regions of memory pages to the remote server based on information received in the previous round. Subsequent rounds of page transmittal S113 are analyzed at the remote server, and more specific feedback is generated S115. For instance, a portion of a data structure includes a list, and a record in the list corresponds with a new element on a different memory page. The specific feedback would instruct the mobile device to retrieve S108 the particular matching page, and transmit that specific region of the different memory page along with any others in the subset S111. The process may be repeated until, eventually, a conclusion is reached as to the presence of malware, or an identification of compromised regions of memory. This drastically reduces the amount of data transmitted and, therefore, the bandwidth and battery usage associated with the communication. The rule may further instruct that the mobile device monitor only specified memory pages for changes or access, thereby further conserving resources on the mobile device.

Additional optional steps include adjusting a size of the page tables or subsets, thereby creating batches, and transmitting the batches upon the crossing of a threshold or expiration of a timer, whichever is first. Further, the host agent may be instructed to retrieve only certain data structures and to ignore other data pages. These adjustments provide additional power savings, and are further described in greater detail in commonly owned and co-pending U.S. patent application Ser. No. 13/106,479, the contents of which are hereby incorporated by reference in their entirety.

Figure 2A:
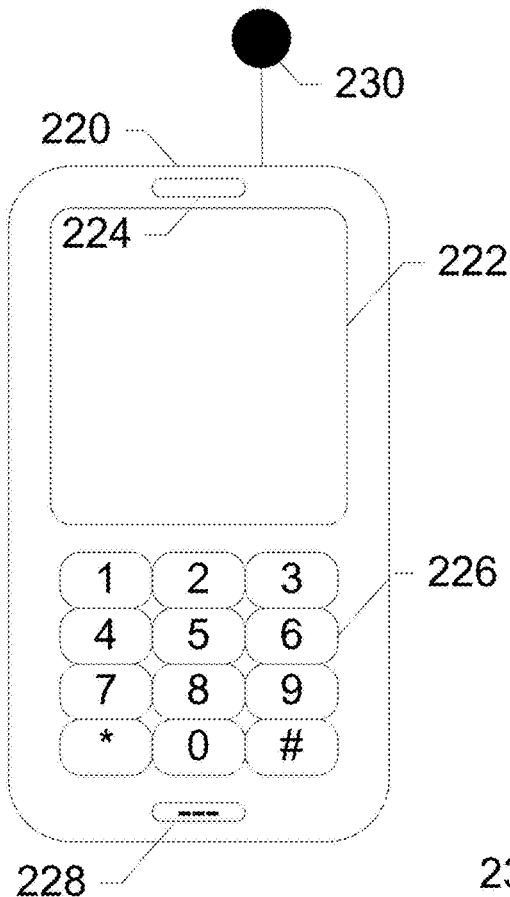
FIGS. 2A and 2B respectively show the components of a mobile device, according to an exemplary embodiment of the subject disclosure.
Figure 2B:
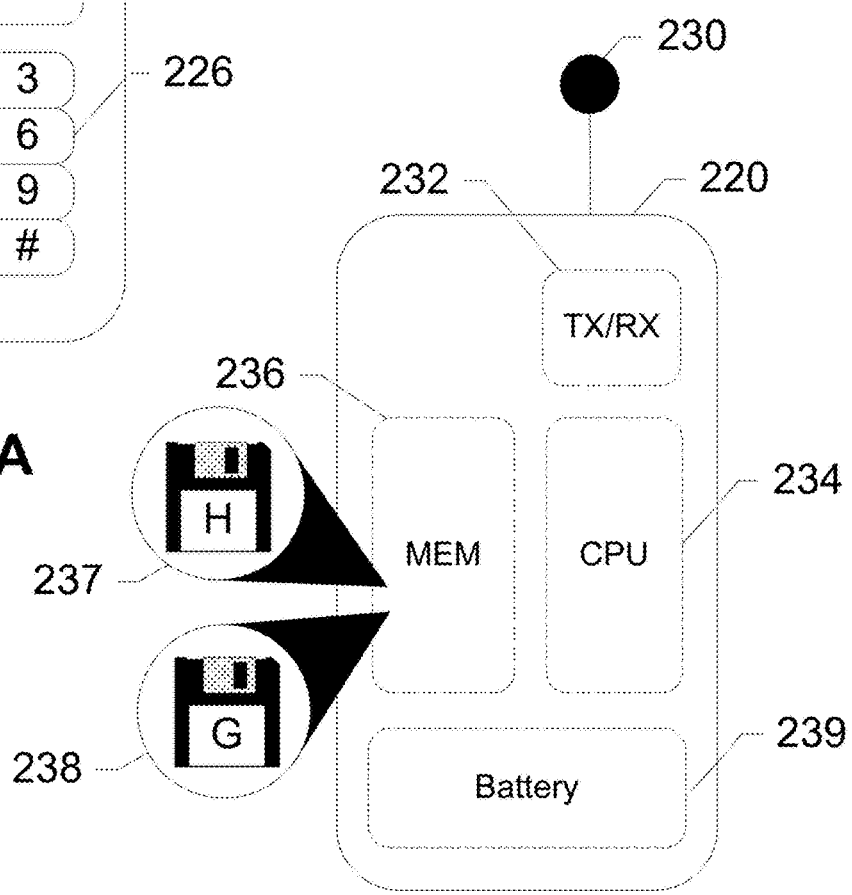

FIGS. 2A and 2B respectively show the components of a mobile device, according to an exemplary embodiment of the subject disclosure.

Referring to FIG. 2A, a mobile device 220 includes a display 222, a speaker 224, an input device such as keyboard 226 or microphone 228, and an antenna 230. Display 222 includes touchscreens that may be used as both input and output devices. Antenna 230 receives cellular radio signals over the air to be processed by the internal components of mobile device 220. As is well-understood in the art, other features such as external speakers, input buttons/sliders, slide out keyboards, etc. are not shown but can be incorporated into other exemplary embodiments of the mobile device.

Referring now to FIG. 2B, the internal components of mobile device 220 include a transceiver 232 in communication with a Central Processing Unit (CPU) 234 that is in turn in communication with a memory 236. All the components are powered by a battery 239. CPU 234 is any microprocessor, such as sold under the INTEL brand or the ARM brand, as known in the art and suitable for operating portable electronic devices such as mobile device 220. Transceiver 232, via antenna 230, receives, processes, and transmits radio signals, such as GPRS, cellular radio, BLUETOOTH (wireless technology standard for exchanging data over short distances), Wi-Fi, etc. In other exemplary embodiments, features such as Global Positioning System (GPS) units, accelerometers, infra-red (IR) transceivers, etc., which are not shown, can be included in mobile device 220. Other types of processors can be used and may take different forms depending on whether the mobile device is a cellular telephone, laptop computer, etc.

In addition to firmware, software, etc., memory 236 is home to a host domain 237, and a guest domain 238. Host domain 237 may be a hypervisor, in which case guest domain 238 would be a kernel or other virtual machine running on the hypervisor. Alternatively, host domain 237 may be an operating system or kernel, in which case guest domain 238 would be any application or logic running on top of the kernel and having its own memory space. In either case, a memory management unit (MMU) within host domain 237 allocates memory pages for the guest 238, and is able to identify the portions of guest 238 and the occupying memory pages. Further, a host agent on host domain 237 in conjunction with a rule database detects page faults caused by memory pages on guest domain 238, records the page fault in a page table, applies rules to the page fault; retrieves one or more matching pages from guest domain 238; and transmits the subset of memory pages to the remote server for analysis, as further described in detail herein.

The host agent may reside on a hypervisor, enabling it to be protected from a compromised kernel, while retaining the ability to inspect the kernel. The host agent inspects memory activity on the interested domain, traps any access or modification to a memory page, and, in the case of executable memory, determines that the memory page needs scanning by generating a unique identifier, such as a hash, etc., of the memory page and comparing that identifier against a cache of previously analyzed memory pages. If the memory page identifier is not present in the cache, then the memory page is transmitted to a remote server for analysis. The remote server may be operated by a mobile service provider, third-party vendor, or a trusted local machine accessible via a local area network.

A rule database aboard a trusted domain on the mobile device is dynamically updated with the feedback from the remote server. The feedback may be stored as new rules, or as factors to be weighed when determining which files and pages to transmit. This further improves performance of the system while minimizing resource usage. For instance, feedback rules may be stored in both a local cache on the host agent and in a shared remote cache on the remote server. Subsequent access to that memory page will trigger a lookup in the local cache without requiring network access.

Figure 3:
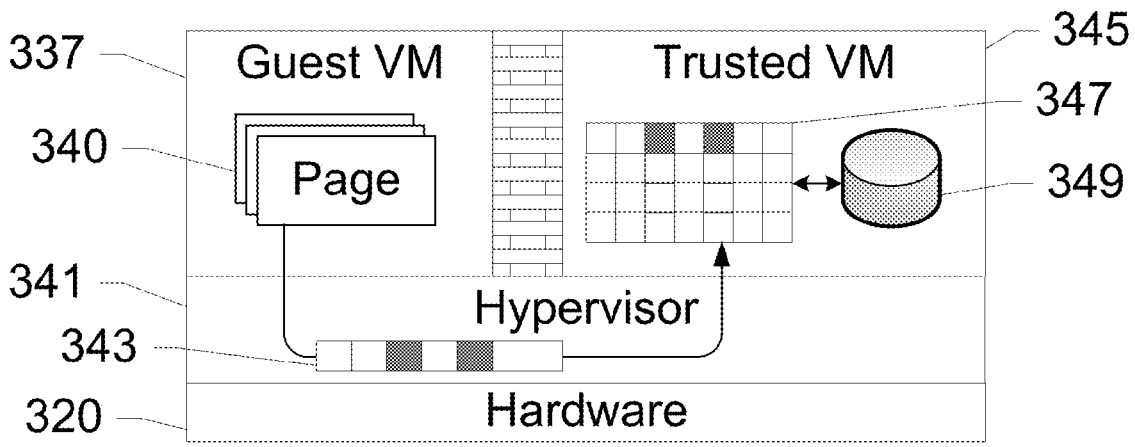
FIG. 3 shows a system for detecting malware using a hypervisor and a trusted virtual machine, according to an exemplary embodiment of the subject disclosure.
Figure 4:
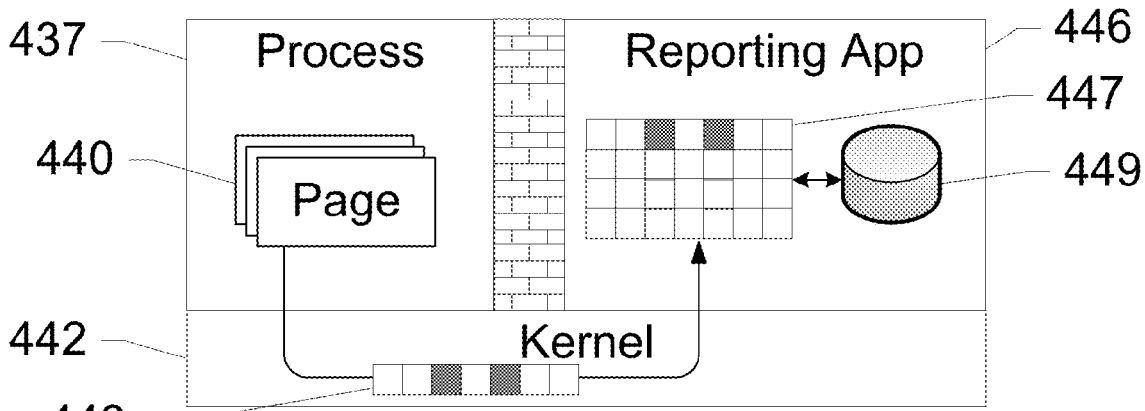
FIG. 4 shows a system for detecting malware using a kernel and a reporting application, according to an exemplary embodiment of the subject disclosure.
Figure 5:
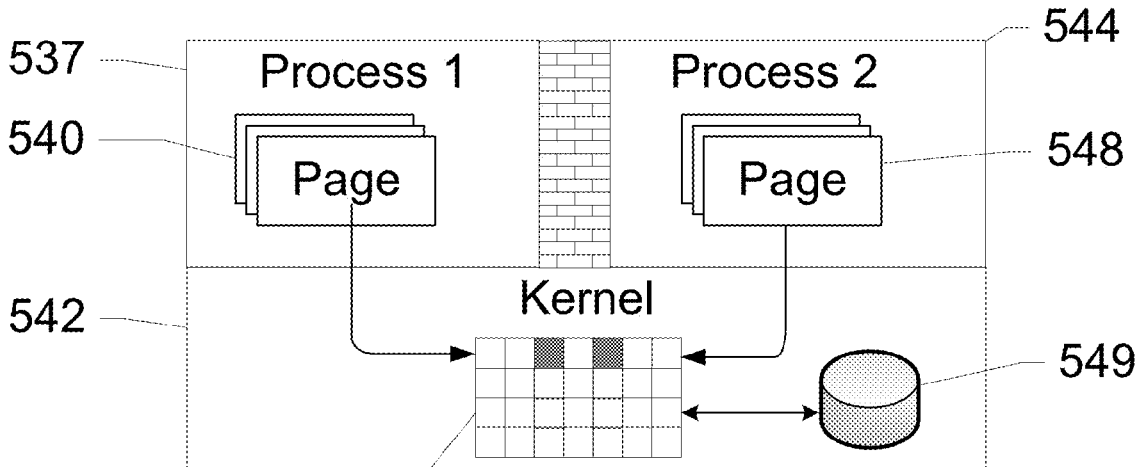
FIG. 5 shows a system for detecting malware using a kernel, according to an exemplary embodiment of the subject disclosure.

FIGS. 3-5 show various systems for isolating guest domains from host domains, according to exemplary embodiments of the subject disclosure. For instance, FIG. 3 shows an exemplary embodiment of a system for detecting malware using a hypervisor and a trusted virtual machine (VM). A hypervisor 341 resides on a memory of mobile device 320. Mobile device 320 is substantially similar to the mobile device described in FIGS. 2A-2B. Hypervisor 341 mediates between mobile device 320 and virtual machines 337 and 345, and guarantees isolation between the guest domain (the monitored system) 337, and the trusted domain (the monitoring tool) 345. Guest VM 337 includes a kernel or process occupying memory pages 340. Hypervisor 341 includes a memory management unit (MMU) 343 for monitoring and recording page changes. Trusted VM 345 includes a storage space (such as a page table) 347, and a rule database 349 for applying rules to pages captured by MMU 343. When trusted VM 345 applies a rule, it communicates the results to hypervisor 341, which takes appropriate action, be it retrieving additional memory pages 340 or taking over the user interface on the mobile device 320 and alerting the user.

MMU 343 first sets permission bits on all the pages 340 in guest VM 337. When a page 340 is modified or executed, the permission bit causes a processor fault. MMU 343 receives the fault, pauses the guest domain, and transmits information about the fault to a host agent aboard trusted VM 345, to be stored in page table 347 and subject to the rules in rule database 349. Page table 347 enables fast verification of pages by virtue of having stored within a record of memory pages that have been approved and that have not changed. Thus, the trusted domain (including trusted VM 345 and hypervisor 341) is aware of the entry point of each memory page. The user agent onboard trusted VM 345 applies the rules in rule database 349, retrieves (via hypervisor 341) matching memory pages from guest VM 337, generates a subset of pages, and transmits the subset to a remote server. It then receives feedback from the remote server, updates rule database 349, and applies the new rules to subsequent page faults stored in page table 347.

Although the present embodiment shows a trusted domain to include the hypervisor and a trusted VM to handle applying the rule to the page table and generate the subset of pages, other configurations are possible. For instance, a more functional hypervisor (and therefore larger), such as Kernel-Based Virtual Machine (KVM) includes logic for not only maintaining page tables and applying rules, but also having networking features, running hardware drivers, and so on. In such a case, the entire functionality would be stored on the hypervisor itself, forming the trusted domain. This is contrasted with very slim lightweight hypervisors (more secure, less vulnerable to exploitation), such as XEN and SEL4 hypervisors popular in embedded devices, that require additional VMs having the ability to transmit and receive network packets and operate hardware drivers.

Further, FIG. 4 shows an exemplary system for detecting malware using a kernel and a reporting application. In this embodiment, process 437 is the guest domain running on a kernel 442. The trusted domain includes kernel 442 and a reporting application 446. Similar to the hypervisor of FIG. 3, kernel 442 guarantees isolation between process 437, and reporting app 446. Process 437 occupies at least memory pages 440, any access or modifications thereof being detected by a memory management unit (MMU) 443 that is a part of kernel 442. Reporting application 446 maintains a storage space (such as a page table) 447, and a rule database 449 for applying rules to pages trapped by MMU 443. When reporting application 446 applies a rule, the results are communicated to kernel 442, which takes appropriate action, be it retrieving additional memory pages 440 or taking over the user interface on the mobile device and alerting the user.

In this embodiment, the process 437 may be any user space process running on kernel 442, such as applications including word processors, web browsers, video games, etc. Similar to the idea of a virtual machine, an application or process 437 is restricted to a particular set of memory pages. Pages 440 associated with process 437 may include executables related to the application or files being used and modified by the application, including documents being worked on at the time by a user. Consequently, when a page is accessed or modified, the process is momentarily halted while kernel 442 and reporting application 446 record the page fault in table 447, and continues when the exception is cleared. Meanwhile, a user agent (in this case, reporting application 446) applies the rules in rule database 449, retrieves (via kernel 442) matching memory pages from process 440, generates a subset of pages, and transmits the subset to a remote server. It then receives feedback from the remote server, updates rule database 449, and applies the new rules to subsequent page faults stored in page table 447

FIG. 5 shows an exemplary system for detecting malware using only a kernel, according to an exemplary embodiment of the subject disclosure. As described above, a hypervisor may include all necessary logic (such as a user agent) to store page faults, apply rules to memory pages, generate a subset of memory pages, and transmit the subset across a network to a remote server. In this embodiment, the kernel 542 is similarly equipped. In other words, the kernel 542 is the trusted/host domain, while processes 537 and 544 reside in separate regions of memory running on kernel 542. Analogous to the MMU, a component in the kernel 542 (or operating system) monitors pages 540, 548 in processes 1 and 2, and this component within kernel 542 programs page table 547. Further, this component (the user agent in other words) assembles the subset of pages to be sent to the remote server, where extremely powerful existing methods are used to scan everything.

Figure 6:
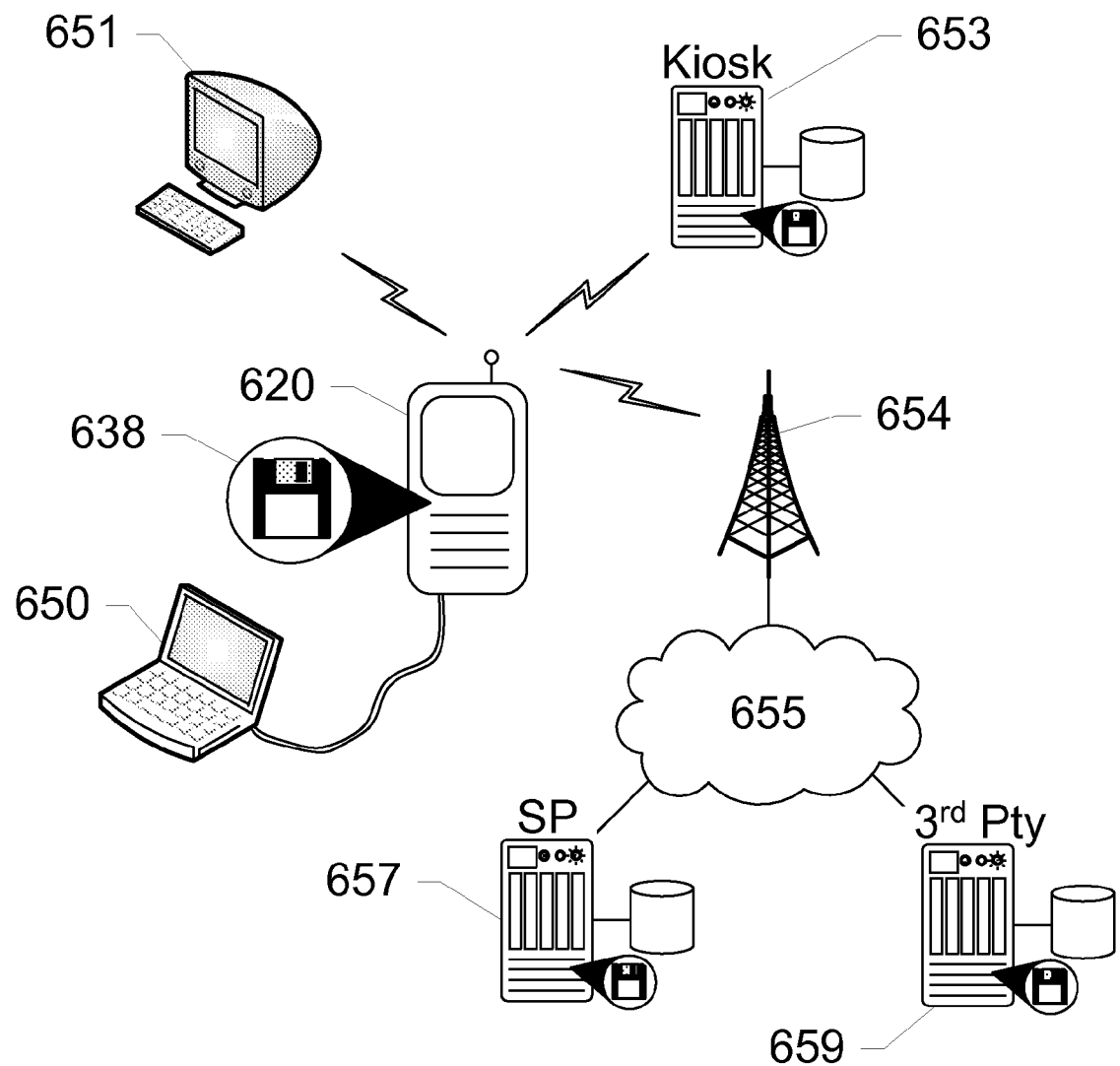
FIG. 6 shows a system for offloading malware detection to a remote server, according to an exemplary embodiment of the subject disclosure.

FIG. 6 shows a system for offloading malware detection to a remote server, according to an exemplary embodiment of the subject disclosure. The system includes a mobile device 620 having onboard a user agent 638, personal servers 650 and 651, a public kiosk 653, a cellular network 654 that is connected to a cloud network 655, service provider (SP) server 657, and $3^{rd}$ party server 659. Briefly, user agent 638 is programmed to determine the best available remote server and to transmit its subset of potentially compromised memory pages to the best available server. Personal server 650 is generally available via a wired connection, such as USB. Similarly, personal server 651 is an at-home remote server solution, accessible via a wireless local area network (WLAN). Kiosk 653 is similarly accessible via a WLAN, and may serve as a backup option in case neither personal server is present, or in case that wireless network 654 is unavailable. If wireless network 654 is available, then additional options include servers 657 and 659. SP server 657 is owned and operated by a provider of cloud 655 (and perhaps even network 654), and may have a service-level agreement (SLA) with a user of mobile device 620. The SLA provides terms of use, a quality of service (QoS) assurance, and may include billing for malware detection along with a regular phone bill for user of device 620. Alternatively, the user may contract with a $3^{rd}$ party that provides cloud server 659 for analysis, in a manner similar to SP server 657, but using a different SLA. For instance, a user may subscribe to a cloud computing service such as EC2 operated by AMAZON, and offload any CPU-intensive procedures (including malware detection) to their remote server. Finally, kiosk 653 may be any public kiosk for offloading malware detection under a completely different temporary SLA, such as one available by paying using a credit card or other mechanism. Kiosk 653 is a locally-accessible fallback mechanism in case the cellular network 654 is unavailable.

As mentioned above, one of the remote servers receives the potentially compromised files from the user agent, identifies malicious or unwanted content, and provides feedback to the host agent across the network. Generally, the remote server is well-provisioned with logic and databases to determine the presence of malware or virus. For instance, the logic on the remote server is programmed with a map of most data structures within a kernel of an operating system. Correlational databases of other types of memory pages, and regions within memory pages, may be included. In the case of executable code, the onboard scanner hashes the received code page(s), and compares the code to a whitelist of known software, the whitelist including hashes of all approved memory pages and stored in a hash database on the server. The hash database includes at least an instruction number, a relative position, a process identity and the cryptographic hash for each known page. This information is intended to optimize the search that happens within the hash database. The result of the search identifies the page, the originating code, and whether or not this page is populated with well known code that comes from reputed vendors, such as known OS executables and so on. Several different versions of the OS kernel could be used to populate this database as well as well known device drivers and commonly used applications.

Although some of the information necessary to scan memory data structures exists in the form of rules on the trusted domain of the mobile device itself, a significantly larger number of invariants are provided to the remote server. Scanning logic on the remote server determines either a presence of malware, or a possibility of malware, and correlates the received memory page with its own database to determine what type of feedback to provide to the host agent. For instance, a memory page may be linked to a plurality of additional files or regions of files that are part of the kernel. Any associated memory pages that would be helpful but are not included in the original subset are requested from the mobile device 620 via a feedback rule. For instance, scanning logic onboard the server identifies pointers in received root symbols, and requests additional pages that contain data structures referenced by these pointers. Once additional data structures have been received (in $2^{nd}$ and $3^{rd}$ subsets transmitted from mobile device 620) and reconstructed, data structure invariants that specify kernel integrity constraints are verified by referring to an invariant database onboard the remote server. Some invariants are simple to verify: the values of function pointers must be addresses of known functions while the entries of the system call table should remain constant during the execution of the kernel. Other more complex invariants span sophisticated data structures, for instance, each process that is scheduled for execution must have an entry in the linked list of active processes on the system.

The remote scanner then summarizes all of that information, including required regions within memory pages, and transmits this summary as a feedback rule or a determination of infection to the host agent. The host agent then provides the additional data back to the remote server or acts accordingly with an alert or a more drastic measure such as halting the process.

Moreover, analyzing potentially compromised memory pages at a centralized server further enables crowdsourcing of diverse infections from several mobile devices. A single remote server may receive an extremely large sample of training, i.e. loading its database of invariants with patterns to help identify a large number of data structures and whether or not they are compromised. This increases the chances of providing efficient and accurate feedback to mobile devices, therefore halting more malware. The crowdsourcing feature can be expanded to provide open access to trusted domains on several mobile devices. If a host agent on a mobile device detects a page access or modification, then the host agent can "download" a feedback rule from a shared database to determine what feedback other mobile devices have received with regards to the same file. Shared remote caches are centrally located in the network or a part of the remote server. This reduces the need for repeated analysis by the remote server. Cached reports stored on the shared cache may also be pushed to the host agent to speed up future access, depending upon configurable parameters.

A determination of the ideal remote server is performed via a cascading algorithm of fallbacks starting with the most trustworthy server, and ending with any available server. Briefly, trusted computing relies on the use of a trusted platform module (TPM). The TPM is like a small processor that has buried inside it a cryptographic key that cannot be modified without compromising the integrity of the module itself. This cryptographic key identifies a manufacturer, such as INTEL corporation and brand, and attests to another machine that a trusted platform module is running on the server. Scanning logic onboard the server typically leverages the TPM to verify the code that is running, and to attest to that code by building an identifier made up of code digests signed with the TPM cryptographic key. The code attestation is trustworthy to a third party since the signature with the TPM cryptographic key cannot be forged by a malicious entity. Other types of encryption are possible as well, so long as it can be reasonably relied upon to determine a trusted server. The typical protocol for selecting one out of a plurality of remote servers includes the use of at least one of these security mechanisms, whereby the absence of this feature indicates an untrustworthy server.

Figure 7:
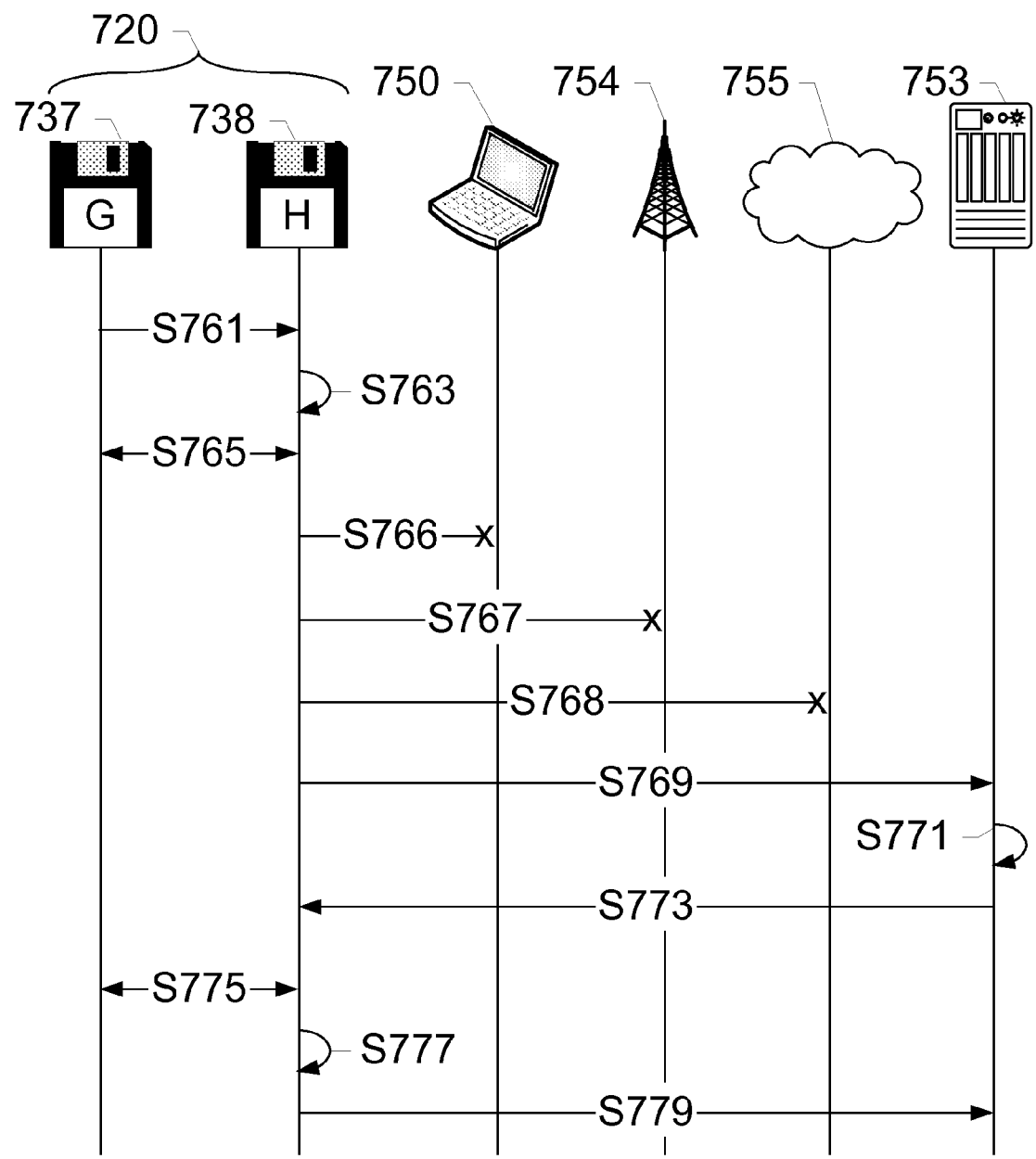
FIG. 7 shows a process flow diagram for finding a remote server, according to an exemplary embodiment of the present

FIG. 7 shows a process flow diagram for scanning data integrity, according to an exemplary embodiment of the present subject disclosure. As described above, a guest domain 737 and a host domain 738 both reside on a memory of a mobile device 720. A user agent onboard host domain 738 receives a page fault S761 from an attempt to modify or access a memory page in guest domain 737. The user agent determines S763 via its internal rule database whether or not to retrieve additional memory pages to transmit to a remote server. Upon making this determination the host domain 738 retrieves any matching memory pages S765, and attempts to transmit these to a remote server. The first attempt S766 is to reach a local server 750, as this may be a known machine that is guaranteed to be secure. However, the first attempt S766 fails, possibly because the local machine 750 is unavailable.

As a fallback, host 738 attempts S767 to connect to wireless network 754 in order to access a cloud-based server. In this embodiment, the attempt S767 fails because wireless network 754 is unavailable. This could be because a wireless signal is unavailable to mobile device 720, or a network outage prevents communication S767 with wireless network 754. Host 738 then attempts to connect to a cloud server 755 via any other means S768, such as using a data connection, etc. However, even this attempt S768 fails.

The last fallback mechanism is to communicate with a public kiosk via an alternate connection such as a local connection S769. For instance, the user may simply travel to the nearest convenience store or central location that provides a local machine 753 that includes a scanning feature. A successful connection S769 enables kiosk 753 to receive the potentially infected file/memory page, inspect the file/memory page S771, and transmit feedback S773 back to host 738. Host 738 retrieves any additional memory pages S775 required by feedback rule transmitted from server 753, applies its own rules S777 to ensure that no private data is being shared (as described above), and transmits additional required memory pages S779 to kiosk 753. This process S773-S779 continues until a determination is made as to the presence of malware, and appropriate action is taken. A dynamic SLA may be entered into prior to accessing S769 kiosk 753. Further, all of the servers that host 738 attempts to connect to have a trusted encryption or signature, such as the TPM described above, otherwise there would be no reason to attempt to connect to the server.

As described above, privacy rules may be implemented to protect sensitive data. While the feedback received from the remote server is specific in terms of memory regions of the data structures it needs for analysis, the host agent may screen the memory regions with privacy rules before transmitting them to the remote server. In other words, a local algorithm may be executed to redact sensitive data, or "censor" any private information before transmittal. For instance, the contents from a sensitive memory region may be read and written to the region of memory with a granularity of one page, typically 4 kilobytes in size. Specific pages containing sensitive file data are monitored, and these pages may be tagged as being private. Any requests for these regions of memory are denied. Furthermore, such specific requests for private data may be used to generate an alert that a server is fraudulent or malicious. Further, the system can learn as it acknowledges memory pages residing in specific regions of memory as being private.

According to the subject disclosure, the frequency of checks is adjusted by either periodic polling (where the period is configurable), and/or by event-based or interrupt-based notifications to trigger the malware scanner. These methods add efficiency by preventing the use of busy loops that burn too much CPU power, and overcome the deficiencies of sleep timers that ignore momentous events. Further, the subject disclosure includes modifying a surface of attack that is to be scanned. Adjusting the frequency and attack surface minimizes a window of vulnerability while maximizing battery life.

The security services provided by various remote servers are not limited to virus or malware detection. A cloud platform enables a range of different security services. For instance, SMS Spam Filtering, which is currently implemented in an ad-hoc manner by some mobile antivirus products, and can be much more accurate in a centrally deployed server on a network through the aggregation of data from a large number of users, similar to the crowdsourced malware detection described above. Further, a centralized location enables service providers to provide anti-phishing tolls to detect and prevent phishing attacks against their mobile customers. Centralized Blacklists of various communication addresses, such as BLUETOOTH (wireless technology standard for exchanging data over short distances) and IP, may be implemented as a cloud security service. These blacklists may be maintained on a global level by a service provider for known malicious entities or on a personal user-specified level. These centralized policies may be opportunistically pushed to client devices for enhanced performance. Most importantly, this architecture significantly lowers the bar for extending novel security services to mobile devices by introducing a new algorithm that is effective against detecting malicious mobile applications that is seamlessly integrated into the network service and put into operation without affecting any of the existing mobile devices' functionality. This transparent extensibility is a very powerful tool as mobile platforms and their needs are rapidly evolving.

Additionally, the subject disclosure may be complemented with other methods to sidestep the security-energy tradeoff for detecting certain kinds of malware. For instance, the subject disclosure may be combined with behavior-based techniques such as offloading the observation of activities on the guest domain, including SMS message forwarding, spam email, etc., and generating power profiles for detection of any similar suspicious activity. An adaptive security/energy profile may be generated to complement the above-discussed balanced profile. The subject disclosure may further be combined with pre-emptive approaches to detect and discard large fractions of malware before they ever reach the mobile device. Such techniques can complement host-based detectors that can run using conservative security/energy profiles when "trusted" applications are downloaded and executed. Malware scan settings may be adjusted through a web portal, an application within the trusted domain on the mobile device, or a hardware control on the mobile device.

The foregoing disclosure of the exemplary embodiments of the subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the subject disclosure, the specification may have presented the method and/or process of the subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the subject disclosure should not be limited to the performance of their steps in the order written, and one skilled in the art can readily appreciate that the sequences may be varied and still remain within the spirit and scope of the subject disclosure.

What is claimed is:

1. A method for detecting malware on a mobile device, the method comprising:
   detecting a page fault caused by a memory page on a guest domain of the mobile device;
   recording the page fault in a page table on a host domain of the mobile device;
   applying a rule to the page fault, the rule identifying one or more matching pages;
   retrieving the one or more matching pages from the guest domain; and
   transmitting the one or more matching pages along with the memory page to a remote server for analysis.

2. The method of claim 1 wherein the rule is a feedback rule, the method further comprising:
   receiving the feedback rule from the remote server; and
   storing the feedback rule in a rule database on the host memory.

3. The method of claim 2, further comprising halting the process in response to the feedback rule.

4. The method of claim 1, wherein the rule is a pre-programmed rule.

5. The method of claim 4, further comprising:
   determining that the one or more matching pages includes a private datum; and
   removing the private datum from the one or more matching pages.

6. The method of claim 1, wherein detecting the page fault further comprises detecting one of a modification of the memory page by a process and an execution of a process including the memory page.

7. The method of claim 6, wherein recording the page fault further comprises:
   tagging the page fault with a tag; and
   transmitting the tag along with the memory page to the remote server.

8. The method of claim 7, wherein the tag includes one or more of a process ID, a process state, a category, and a page address.

9. The method of claim 1, wherein the host domain is a hypervisor; and wherein the guest domain is a virtual machine residing on the hypervisor.

10. The method of claim 9, wherein the host domain includes a trusted virtual machine on the hypervisor, the trusted virtual machine including logic for transmitting the matching pages to the server.

11. The method of claim 1, wherein the host domain is a kernel, and wherein the guest domain is a user space process residing on the kernel.

12. The method of claim 1, further comprising determining a trusted remote server from a plurality of remote servers.

13. The method of claim 12, wherein the trusted remote server is one of a personal server, a network-operated server, a third-party server, a cloud server, and a kiosk.

14. The method of claim 1, further comprising:
   determining that a network connection is unavailable to transmit the memory pages; and
   starting a local malware scan.

15. The method of claim 1, further comprising adjusting one or more of a frequency of transmittal of the memory pages and a batch size of the page faults within the page table.

16. A mobile device, comprising:
   a processor;
   a memory in communication with the processor;
   a guest domain on the memory, the guest domain including at least a process and a memory page associated with the process; and
   a host domain on the memory, the host domain having a logic unit including instructions for:
      detecting a page fault caused by a memory page on the guest domain;

recording the page fault in a page table on the host domain;

applying a rule to the page fault, the rule identifying one or more matching pages;

retrieving the one or more matching pages from the guest domain; and transmitting the one or more matching pages along with the memory page to a remote server for analysis.

17. The mobile device, of claim 16, further comprising a transceiver for transmitting the memory pages to the remote server across a network.

18. The mobile device of claim 17, wherein the host domain is a hypervisor; and wherein the guest domain is a virtual machine residing on the hypervisor, the mobile device further comprising a trusted virtual machine on the hypervisor, the trusted virtual machine being enabled with a driver to operate the transceiver.

19. A system for detecting malware on a mobile device, the system comprising:

a server in communication with a mobile device, the mobile device having a processor and a memory, the memory including a guest domain and a host domain, the guest domain including a process and a memory page associated with the process, the host domain having a logic unit including instructions for:

detecting a page fault caused by a memory page on the guest domain;

recording the page fault in a page table on the host domain;

applying a rule to the page fault, the rule identifying one or more matching pages;

retrieving the one or more matching pages from the guest domain; and transmitting the one or more matching pages along with the memory page to the server; and analysis logic on the remote server for:

determining security properties of the received memory pages, generating a feedback rule, and transmitting the feedback rule to the host domain on the mobile device.

20. The system of claim 19, wherein the feedback rule includes one or more of a request for additional matching pages and an instruction to halt the process associated with the memory page.

* * * * *